United States Patent
Dubuisson et al.

(10) Patent No.: US 8,505,849 B2
(45) Date of Patent: Aug. 13, 2013

(54) DEVICE FOR RETRACTING AIRCRAFT LANDING GEAR

(75) Inventors: Marc Dubuisson, Ville d'Avray (FR); Marc Brune, Velizy-Villacoublay (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 143 days.

(21) Appl. No.: 13/125,717

(22) PCT Filed: Nov. 10, 2009

(86) PCT No.: PCT/FR2009/001297
§ 371 (c)(1), (2), (4) Date: Apr. 22, 2011

(87) PCT Pub. No.: WO2010/063893
PCT Pub. Date: Jun. 10, 2010

(65) Prior Publication Data
US 2011/0198441 A1 Aug. 18, 2011

(30) Foreign Application Priority Data

Dec. 5, 2008 (FR) ...................................... 08 06854

(51) Int. Cl.
*B64C 25/12* (2006.01)
(52) U.S. Cl.
USPC ............... 244/102 SS; 244/102 R; 244/102 A
(58) Field of Classification Search
USPC ............ 244/50, 102 R, 102 A, 102 SS, 103 R
See application file for complete search history.

(56) References Cited

U.S. PATENT DOCUMENTS

| 2,621,004 | A | | 6/1950 | Ashton et al. | |
|---|---|---|---|---|---|
| 3,195,840 | A | * | 7/1965 | Tollar | 244/102 R |
| 4,720,063 | A | * | 1/1988 | James et al. | 244/102 R |
| 5,429,323 | A | * | 7/1995 | Derrien et al. | 244/102 R |
| 7,731,124 | B2 | * | 6/2010 | Griffin | 244/102 R |
| 2010/0116930 | A1 | * | 5/2010 | Griffin | 244/102 A |

FOREIGN PATENT DOCUMENTS

| EP | 0 560 649 A1 | 9/1993 |
|---|---|---|
| GB | 1 216 732 A | 12/1970 |
| GB | 2 234 948 A | 2/1991 |

\* cited by examiner

*Primary Examiner* — Philip J Bonzell
(74) *Attorney, Agent, or Firm* — Sughrue Mion, PLLC

(57) ABSTRACT

An aircraft undercarriage having a strut (1) hingedly mounted to the aircraft, and a bottom part (2) carrying the wheels and movable relative to the strut. The bottom part has a rod that slides in the strut and a scissors linkage between the strut and the rod. The undercarriage has a shortener for shortening the undercarriage between a deployed position and a raised position by causing the rod to enter into the strut (1). The shortener has coupled first and second members (11, 12), the first member (11) coupled to the bottom part (2) or to an element (5) that moves with the bottom part during its movement relative to the strut. The second member (12) is hinged to the aircraft so that while the undercarriage is raised, the second member abuts before the undercarriage reaches the raised position. The first member (11) is coupled to the scissors linkage.

4 Claims, 3 Drawing Sheets

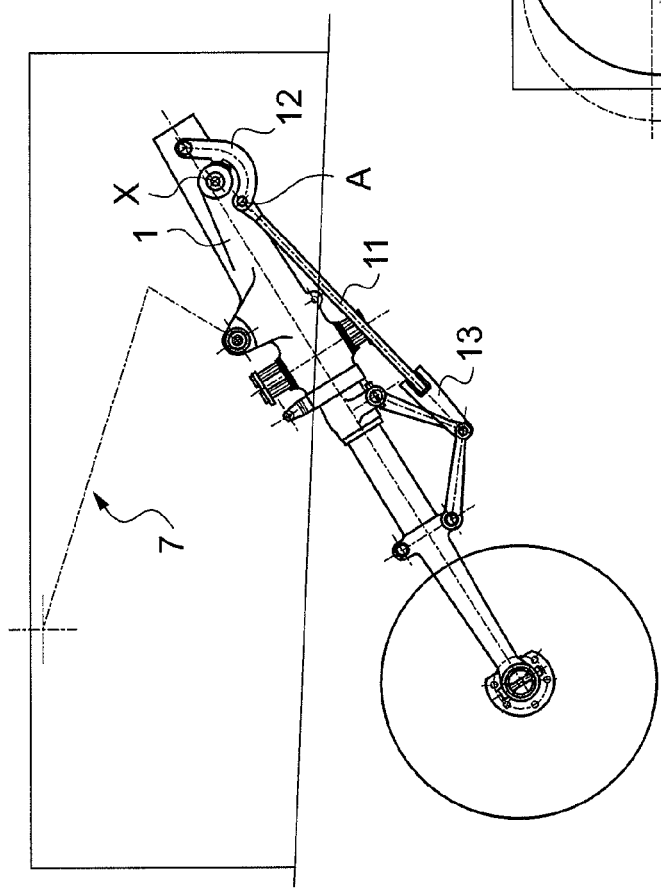
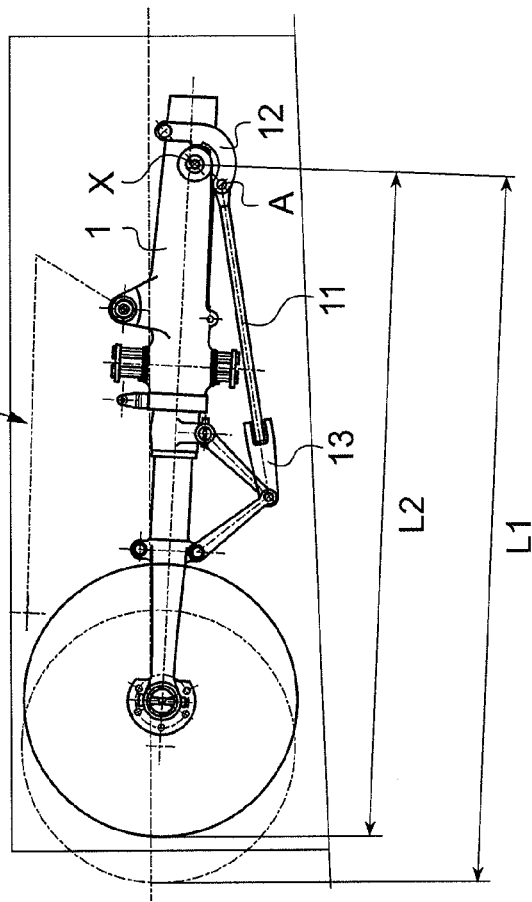
Fig.4
Fig.5

DEVICE FOR RETRACTING AIRCRAFT LANDING GEAR

CROSS REFERENCE TO RELATED APPLICATIONS

This application is a National Stage of International Application No. PCT/FR2009/001297 filed Nov. 10, 2009, claiming priority based on French Patent Application No. 08-06854 filed Dec. 5, 2008, the contents of all of which are incorporated herein by reference in their entirety.

The invention relates to a device for shortening an aircraft undercarriage.

BACKGROUND OF THE INVENTION

When an undercarriage is in the deployed position, prior to being raised, it presents a maximum length, given that the shock absorber fitted to the undercarriage is fully relaxed. Unfortunately, this length may be longer than the length available in the undercarriage bay. It is then appropriate to fit the undercarriage with a shortener device that enables it to be inserted into the bay at the end of being raised.

Various devices are known. For example, the main undercarriage of the Airbus A340 is provided with a shock absorber that is movable inside the strut of the undercarriage between an extended position when the undercarriage is deployed, and a retracted position at the end of raising the undercarriage, thus having the effect of shortening the total length of the undercarriage, without compressing the shock absorber.

That device is complex and heavy since it requires a shock absorber to be provided that can slide inside the strut. Furthermore, the linkage that controls the movement of the shock absorber is subjected to landing forces in full, which means that it needs to be dimensioned accordingly.

In other shortener devices, the shock absorber is compressed in order to reduce the total length of the undercarriage. For example, undercarriages are known that include a telescopic link having its bottom end secured to the slide rod of the shock absorber and its top end secured to the strut, more precisely to an attachment point that is movable on the strut between a landing position and a raising position. When the undercarriage is deployed, the attachment is in a landing position in which the telescopic link is fully relaxed so that the shock absorber is itself fully relaxed. On landing, the telescopic link is compressed together with the compression of the shock absorber. While the landing gear is being raised, the attachment of the telescopic link is brought progressively to a raising position, thereby exerting a traction force on the telescopic link which tends to compress the shock absorber and thus shorten the undercarriage. The movement of the attachment of the telescopic link from the landing position to the raising position may be obtained in various ways. It is possible to make use of the movement of the side brace arm while raising the undercarriage, or it is possible to mount the attachment of the telescopic link to a lever that is hinged to the strut, which lever is itself connected to a fixed point of the structure of the aircraft by means of a link such that raising the undercarriage causes the lever to pivot, thereby causing the attachment point of the telescopic link to move from the landing position to the raising position.

In other shortener devices, the telescopic link is replaced by a simple slide rod in a bearing that is mounted to move on the strut between a landing position and a raised position. The bearing is moved by making use of the relative movement of the strut while the undercarriage is being raised.

Those various devices share the feature of being quite difficult to design since it is necessary to provide specific hinge points on the strut. The linkage can be complex to define.

OBJECT OF THE INVENTION

An object of the invention is to provide a shortener device that does not require particular attachment points on the strut of the undercarriage.

BRIEF DESCRIPTION OF THE INVENTION

In order to achieve this object, the invention provides an aircraft undercarriage comprising a strut designed to be mounted in hinged manner to a structure of the aircraft, and a bottom portion carrying the wheels and that is movable, the undercarriage also including an undercarriage shortener device for shortening the undercarriage between a deployed position and a raised position, said device comprising first and second members coupled to each other, the first member being coupled to the bottom portion of the undercarriage or to an element that moves together with said bottom portion during movement of said bottom portion relative to the strut, while the second member is hinged to the structure of the aircraft in such a manner that while the undercarriage is being raised, the second member comes into abutment before the undercarriage reaches the raised position.

Thus, during the first fraction of raising, before the second member comes into abutment, the second member pivots under drive from the first member as the undercarriage pivots towards its stowage position. When the second member comes into abutment, it stops moving and therefore can no longer pivot at the rate imparted by the pivoting of the undercarriage. This blocking effect generates a traction force in the first member which pulls on the bottom portion of the undercarriage, thereby shortening the undercarriage.

The device is much simpler than prior art devices since it comprises only two elements. In addition, it does not require any attachment point on the strut. Furthermore, it does not have any sliding element, given that such elements are more difficult to maintain and to implement than are hinged elements.

BRIEF DESCRIPTION OF THE FIGURES

The invention can be better understood in the light of the following description of the figures of the accompanying drawings, in which:

FIG. 4 is a side view of the same undercarriage while it is being raised, at the instant when the first member comes into abutment; and FIG. 5 is a side view of the same undercarriage at the end of being raised, when it is in the stowage position.

In all of the figures, the well for receiving the undercarriage is represented symbolically.

DETAILED DESCRIPTION OF THE INVENTION

Figure 1:
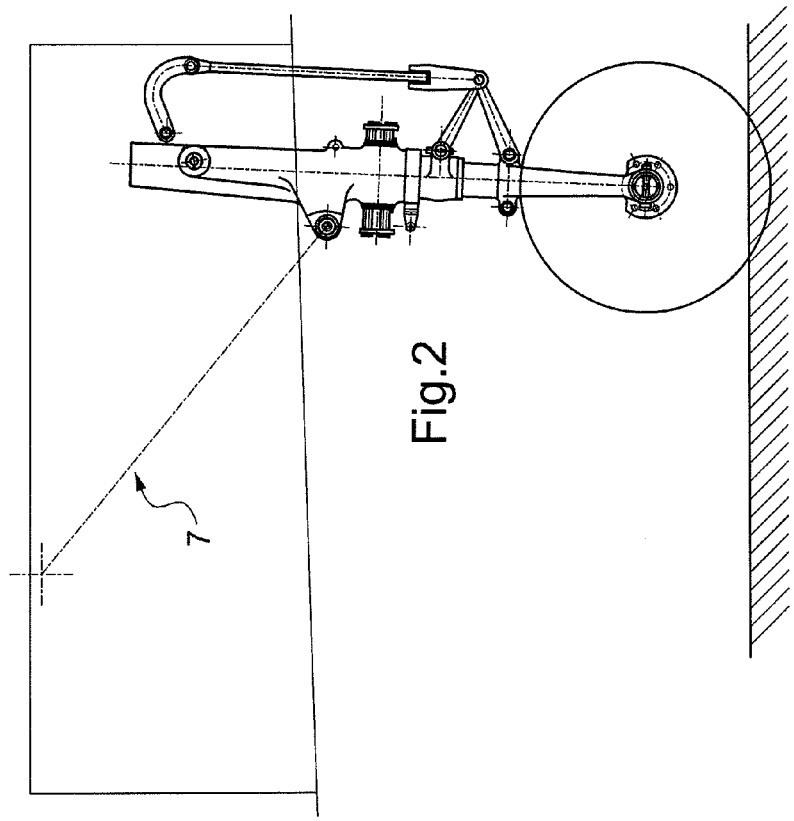
FIG. 1 is a side view of an undercarriage fitted with a shortening device in a particular embodiment of the invention, the undercarriage being in the deployed position.

The device of the invention is applied in this example to an aircraft nose undercarriage. With reference to FIG. 1, the undercarriage comprises in conventional manner a strut 1 hinged to the structure of the aircraft about an axis X that is perpendicular to the plane of the figure.

Inside the strut there slides a slide rod 2 carrying at its bottom end an axle that receives wheels 3. The slide rod 2 forms one of the elements of an internal shock absorber. Here the slide rod 2 is shown in the relaxed position that it occupies when the aircraft is in flight, with the undercarriage deployed.

In order to enable the wheels of the undercarriage to be steered when the aircraft is on the ground, the strut 1 is fitted with a rotary tube 4. The slide rod 2 slides freely inside the rotary tube 4, but it is prevented from turning relative thereto. For this purpose, the undercarriage is fitted with a scissors linkage 5 having a top branch 5A and a bottom branch 5B that are hinged to each other at their apex via a pin referred to as the middle pin. The top branch 5A is hinged to the rotary tube 4, while the bottom branch 5B is hinged to the slide rod 2. In the position shown, all of the hinge axes of the scissors linkage 5 are parallel to the hinge axis X of the strut. Turning of the rotary tube 4 is controlled by a steering actuator 6, here a hydraulic actuator with a rack. The undercarriage is stabilized in the deployed position as shown in this figure by a folding side brace 7, with only the longitudinal axis thereof being shown in the figure, for greater clarity. The above is well known and is repeated merely by way of information.

In the invention, the undercarriage is fitted with a shortener device 10 that comprises:
- a first member 11 in the form of a long connecting rod coupled to the middle pin of the scissors linkage 5 by means of a universal joint 13. The middle pin of the scissors linkage projects from the linkage in order to receive the universal joint 13; and
- a second member 12 that is hinged to the structure of the aircraft, towards the rear end thereof with reference to the raising direction and it is coupled to the first member 11 at a point A by means of a ball joint. In this example, the second member 12 has a curved shape.

Figure 3:
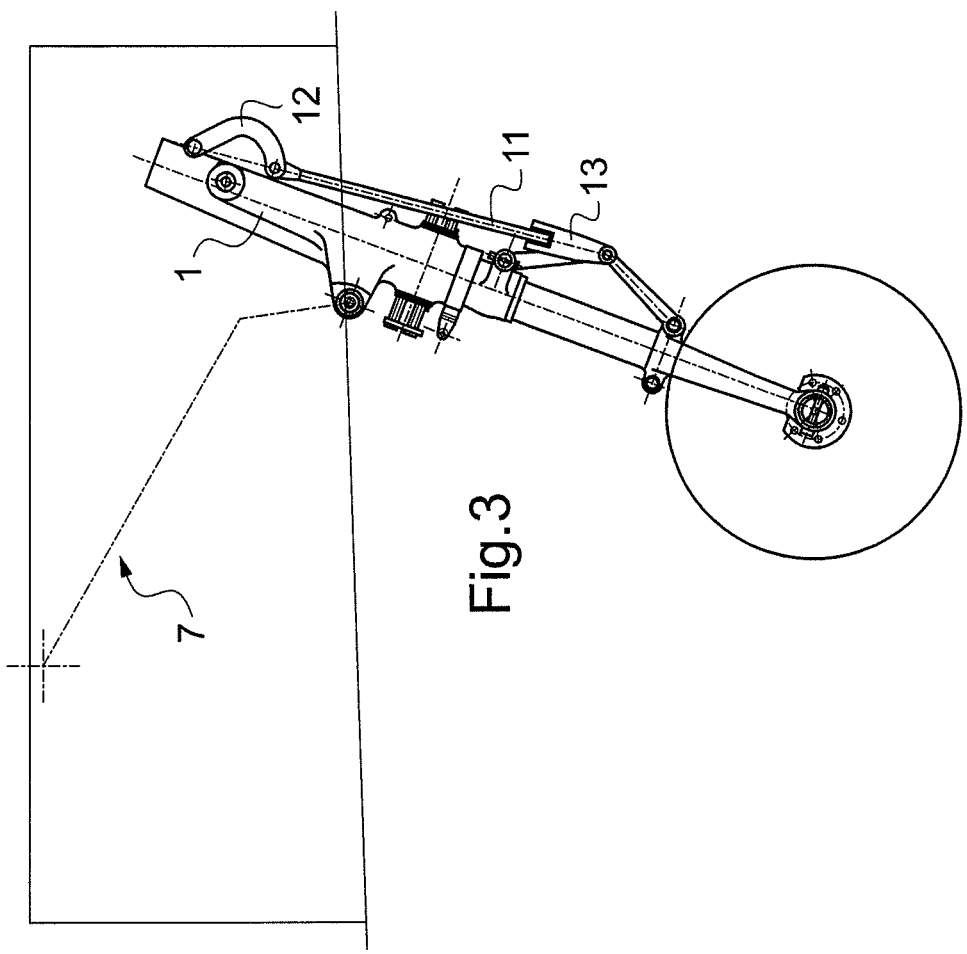
FIG. 3 is a side view of the same undercarriage, shown at the beginning of being raised.

The operation of the device of the invention is as follows. In the situation shown in FIG. 1, the slide rod 2 is in relaxed abutment such that the scissors linkage 5 and strut 1 form a rigid assembly. The undercarriage is raised progressively by a raising actuator (not shown) that causes the undercarriage to turn about the hinge axis X. For this purpose, and as shown in FIG. 3, the side brace 7 is taken out of alignment beforehand by an unlocking actuator (likewise not shown).

The assembly comprising the undercarriage and the shortener device then behaves dynamically as an assembly of three hinged-together elements, two of them (the strut 1 and the second member 12) being hinged to a fixed structure (the structure of the aircraft), and the third element (constituted by the first member 11 and the universal joint 13) being hinged to the other two elements. The assembly deforms freely (and in determined manner) under the action of the raising actuator that causes the undercarriage to pivot, the first member 11 pivoting forwards together with the undercarriage.

The undercarriage continues to be raised until it reaches the situation shown in FIG. 4 in which the second member 12 comes into abutment against the strut 1. At that moment, further rotation of the second member 12 is prevented. The hinge point A between the second member 12 and the first member 11 is thus prevented from moving. Continued raising thus contributes to generating a traction force in the first member 11, which force acts on the scissors linkage 5 so as to tend to cause the slide rod 2 to enter into the strut 1, thereby shortening the undercarriage.

Raising continues to the stowage position shown in FIG. 5, with the undercarriage shortening progressively. During this last fraction of the raising stroke, the second member 12 remains in abutment against the strut. In the stowed position, it can be seen that the length L2 of the undercarriage is shorter than the length L1 of the undercarriage when it is in the deployed position (represented by chain-dotted lines).

The portion of the strut against which the second member 12 comes into abutment constitutes a curved track that acts as a cam. This cam is advantageously of circular profile centered on the hinge axis X, such that the second member 12 remains over the end of raising in the position it occupied on docking against the strut 1. In a variant, the cam may present a varying profile. For example, it may be desirable to terminate the shortening of the undercarriage before the undercarriage wheel penetrates into the bay of the aircraft. Under such circumstances, it is appropriate to provide a cam profile on the strut that is circular, with the exception of the last fraction of raising which should have a profile such that the first member 11 no longer pulls the scissors linkage 5, thus stopping further shortening of the undercarriage. Over this last fraction of raising, the cam profile thus allows the second member 12 to perform additional pivoting.

Figure 2:
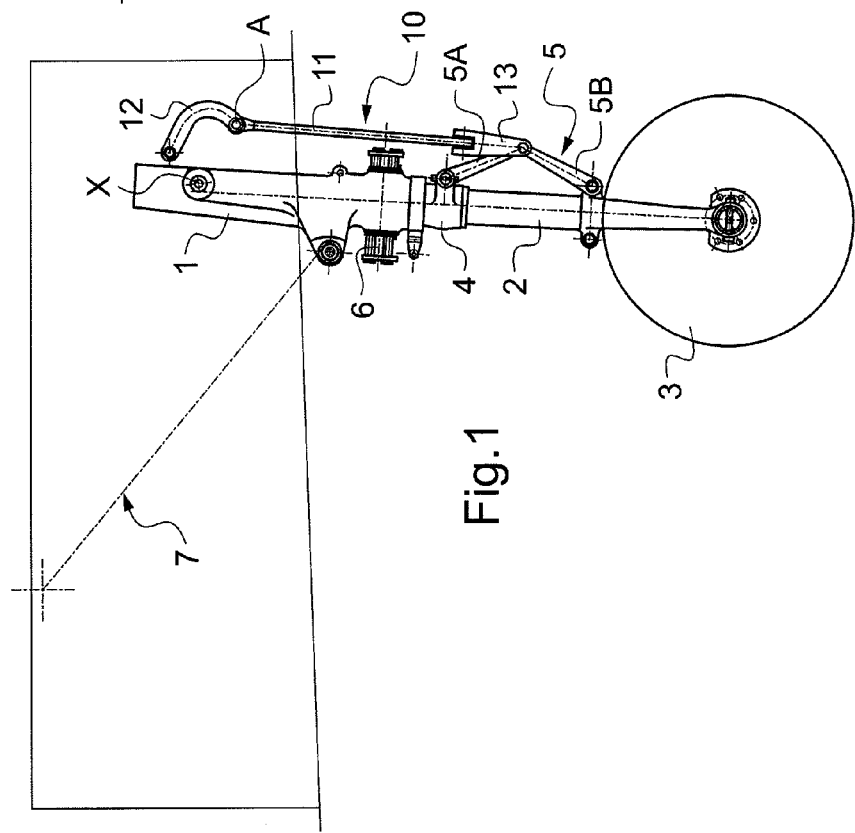
FIG. 2 is a side view of the FIG. 1 undercarriage when the aircraft is on the ground.

It should be observed that in the situation shown in FIG. 1, the second member 12 and the assembly formed by the first member 11 and the universal joint 13 co-operate with the strut 1 and the top branch 5A of the scissors linkage to form a hinged parallelogram. During landing of the aircraft with the slide rod 2 then being pushed into the strut 1, the assembly deforms freely, without opposing any resistance to the slide rod being pushed in, and with the second member 12 pivoting rearwards, as can be seen in FIG. 2. Thus, without using any sliding or telescopic elements, the shortener device of the invention is entirely compatible with the landing gear being pushed in as a result of the aircraft landing.

It should also be observed that the shortener device is also compatible with steering the wheels of the undercarriage. The ball joint between the first member 11 and the second member 12, and the universal joint 13 between the first member 11 and the middle pin of the scissors linkage 5 allows the device to follow the scissors linkage 5 during turning of the rotary tube 4, while remaining connected to the scissors linkage.

The shortener device of the invention is a device that is entirely passive, having a minimum number of parts, all of which are very simple. It can easily be adapted to an existing undercarriage, merely by modifying the middle pin of the scissors linkage and by providing the structure of the aircraft with a hinged fitting for the second member. Where appropriate, the strut should be fitted with a specific docking track facing the first member for the second member to come into abutment thereagainst while the undercarriage is being raised.

The invention is not limited to the above description, but on the contrary covers any variant coming within the ambit defined by the claims.

In particular, although the shortener device is shown in association with an undercarriage that has a device for steering its wheels, the shortener device could also be applied to an undercarriage without any wheel-steering device, e.g. a main undercarriage. The device also applies to an undercarriage in which the hinge axes of the scissors linkage are not parallel to the hinge axis of the strut.

Similarly, although the shortener device is shown in association with a direct undercarriage in which the shock absorber is inside the strut and the wheels are carried by the slide rod, the device could be used in association with a rocker beam shock absorber, in which the wheels are carried by a rocker beam hinged to the strut, the shock absorber being hinged firstly to the rocker beam and secondly to the strut of the undercarriage or to the structure of the aircraft. Under such circumstances, the first member is preferably coupled to the rocker beam.

More generally, it is possible to couple the first member to a bottom portion of the undercarriage that carries the wheels (e.g. the slide rod or the rocker beam), or to any other element that is movable with said bottom portion on moving relative to the strut (e.g. one of the branches of the scissors linkage, the middle pin of the scissors linkage, . . . ). Under all circumstances, the shortener device should be located relative to the undercarriage in such a manner that the traction force imparted by the first member causes the bottom portion to move relative to the strut in a direction tending to shorten the undercarriage. Nevertheless, it is found that coupling the first member to the scissors linkage (where the most practical point is naturally coupling to the middle pin of the linkage) makes it possible to take advantage of the lever effect naturally contributed by the scissors linkage, and thus makes a greater amount of shortening possible.

Furthermore, the connections firstly between the members of the shortener device, and secondly between the members and the structure of the aircraft and the undercarriage may be of any known form (pivot, ball joint, universal joint, . . . ), connection depending on the circumstances or the particular configuration of the undercarriage.

Furthermore, although it is stated that the shortening of the undercarriage begins when the second member comes into abutment, it is possible to cause it to begin sooner, by arranging for the two members to come into alignment before the second member comes into abutment.

Finally, the second member may come into abutment against the strut, as shown, or else against an element that is secured to the strut, e.g. a docking track that is fitted to the strut, or indeed against an abutment that is secured to the structure of the aircraft. Under such circumstances, once the second member has docked against the abutment, it remains stationary during continued raising of the undercarriage.

The invention claimed is:

1. An aircraft undercarriage comprising:
   a strut designed to be mounted in a hinged manner to a structure of the aircraft, and
   a bottom portion carrying wheels of the aircraft and being movable relative to the strut, the bottom portion comprising a slide rod mounted to slide in the strut and a scissors linkage extending between the strut and the slide rod,
   the undercarriage also including an undercarriage shortener device for shortening the undercarriage between a deployed position and a raised position by causing the slide rod to enter into the strut,
   wherein said shortener device comprises first and second members coupled to each other, the first member being coupled to the bottom portion of the undercarriage or to an element that moves together with said bottom portion during movement of said bottom portion relative to the strut, while the second member being hinged to the structure of the aircraft in such a manner that while the undercarriage is being raised, the second member comes into abutment before the undercarriage reaches the raised position, and
   wherein, the first member is coupled to the scissors linkage.

2. An undercarriage according to claim 1, wherein the second member comes into abutment against the strut or an element secured thereto.

3. An undercarriage according to claim 1, wherein the first member is coupled to a middle pin of the scissors linkage.

4. An undercarriage according to claim 3, wherein the first member is coupled to the middle pin of the scissors linkage by a universal joint.

* * * * *